United States Patent
Niu et al.

(10) Patent No.: US 12,555,648 B2
(45) Date of Patent: Feb. 17, 2026

(54) METHOD FOR ACQUIRING INTRACELLULAR DETERMINISTIC EVENTS AND ELECTRONIC APPARATUS

(71) Applicant: PHIL RIVERS TECHNOLOGY, LTD., Haidian District Beijing (CN)

(72) Inventors: Gang Niu, Haidian District Beijing (CN); Yanhui Fan, Haidian District Beijing (CN); Zhendong Feng, Haidian District Beijing (CN); Qiangzu Zhang, Haidian District Beijing (CN); Chunming Zhang, Haidian District Beijing (CN)

(73) Assignee: PHIL RIVERS TECHNOLOGY, LTD., Beijing (CN)

( * ) Notice: Subject to any disclaimer, the term of this patent is extended or adjusted under 35 U.S.C. 154(b) by 1023 days.

(21) Appl. No.: 17/639,726

(22) PCT Filed: Sep. 2, 2019

(86) PCT No.: PCT/CN2019/104007
§ 371 (c)(1),
(2) Date: Mar. 2, 2022

(87) PCT Pub. No.: WO2021/042237
PCT Pub. Date: Mar. 11, 2021

(65) Prior Publication Data
US 2022/0293213 A1    Sep. 15, 2022

(51) Int. Cl.
*G01N 33/48* (2006.01)
*G01N 33/50* (2006.01)
(Continued)

(52) U.S. Cl.
CPC ............ *G16B 20/00* (2019.02); *G16B 40/20* (2019.02)

(58) Field of Classification Search
CPC ........ G16B 20/00; G16B 40/20; G16B 25/10; C12Q 1/68
See application file for complete search history.

(56) References Cited

U.S. PATENT DOCUMENTS

| | | |
|---|---|---|
| 11,015,229 B2 | 5/2021 | Tarcic et al. |
| 2017/0017749 A1 | 1/2017 | Carmeli et al. |
| 2021/0222248 A1 | 7/2021 | Fu et al. |

FOREIGN PATENT DOCUMENTS

| | | |
|---|---|---|
| CN | 104732116 A | 6/2015 |
| CN | 108009400 A | 5/2018 |

(Continued)

OTHER PUBLICATIONS

Meléndez Bárbara, et.a l.: Methods of measurement for tumor mutational burden in tumor tissue, Translational Lung Cancer Research, Society for Translational Cancer Research (STCR), vol. 7, No. 5, Dec. 1, 2018 (Dec. 1, 2018), pp. 661-667.

(Continued)

*Primary Examiner* — Russell S Negin
(74) *Attorney, Agent, or Firm* — Brooks Kushman P.C.

(57) ABSTRACT

A method for predicting intracellular deterministic events and an electronic apparatus are provided. The method includes detecting, by the electronic apparatus, global mutant information of mutant genes of a tested sample taken from a target object, converting the global mutant information of mutant genes of the tested sample into concerted effect (CE) parameters with a quantitative mode, and further converting the CE parameters into concerted effect burden (CEB) parameters through statistical algorithms. The method further includes predicting the intracellular deterministic events based on the CEB parameters.

18 Claims, 6 Drawing Sheets

(51) Int. Cl.
*G16B 20/00* (2019.01)
*G16B 40/20* (2019.01)

(56) References Cited

FOREIGN PATENT DOCUMENTS

| CN | 109192316 A | 1/2019 | | |
|---|---|---|---|---|
| CN | 109346127 A | 2/2019 | | |
| CN | 109949861 A | 6/2019 | | |
| CN | 109994151 A | 7/2019 | | |
| WO | WO-2016013008 A1 * | 1/2016 | ........... | C12Q 1/6886 |
| WO | WO-2017181134 A2 * | 10/2017 | ............. | G16B 20/20 |

OTHER PUBLICATIONS

Stenzinger Albrecht et. al.: Tumor mutational burden standardization initiatives: Recommendations for consistent tumor mutational burden assessment in clinical samples to guide immunotherapy treatment decisions, Genes Chromosomes & Cancer., John Wiley & Sons, Inc., US, vol. 58, No. 8, Aug. 1, 2019 (Aug. 1, 2019), US, pp. 578-588.

International Search Report for PCT/CN2019/104007, Prepared by the China National Intellectual Property Administration, mailing date Jun. 3, 2020, 8 pages including English Translation.

* cited by examiner

METHOD FOR ACQUIRING INTRACELLULAR DETERMINISTIC EVENTS AND ELECTRONIC APPARATUS

CROSS REFERENCE TO RELATED APPLICATION

The present application is a National phase of international patent application No. PCT/CN2019/104007 filed on Sep. 2, 2019, designating the USA, the content of which is incorporated herein by reference.

TECHNICAL FIELD

The present application relates to biomedical technology, and more particularly to a method for acquiring intracellular deterministic events and an electronic apparatus.

BACKGROUND

The genome of tumor cells is highly unstable, resulting in tumors becoming complex diseases with very high heterogeneity. In the past tumor classification methods (such as according to the lesion or disease site, histopathological morphology, etc.), tumors considered to be the same type include several pathophysiological states that respond differently to intervention and disease management, this creates difficulties for the treatment and management of tumors. Therefore, finding indicators and methods that can use tumor genomic characteristic information to distinguish tumor pathophysiological states (determined by the characteristics of several intracellular deterministic events) has become an important research direction to achieve precise tumor treatment and management. Among such indicators that have been developed in the past, tumor mutational burden (TMB) is an example of a class that has achieved certain results in clinical applications.

Tumor Mutational Burden (TMB) is an early global indicator that describes tumor characteristics from the level of genomic variation, by measuring the number of mutations in the genome, which can provide guidance for tumor prognosis and clinical management. The level of TMB is now used as an indicator of the effectiveness of PD-1/PD-L1-targeted immune checkpoint inhibitors.

The basic idea of TMB is to measure the number of variants in a certain genomic subunit, but different institutions have different methods for the selection and counting of subunits, and there is no unified standard and algorithm. In addition, there are huge differences in TMB among different cancer types. Malignant tumors such as lung cancer and skin melanoma have higher TMB, while tumors such as breast cancer and thyroid cancer have lower TMB. In clinical practice, there is no absolute standard for the application of TMB, and the TMB thresholds used in clinical practice for different cancers have individual definitions. Therefore, the number of TMB cannot be directly used as a general evaluation standard for pan-cancer species.

Since the calculation and definition methods of global indicators such as TMB are not uniform, and there is no standardized scheme, the values given by different institutions are different, and the TMB baselines of different cancer types are very different, so it is impossible to give a universal quantitative determination standard. It is possible to make vague qualitative descriptions of tumor characteristics such as "relatively high, medium, and low" in a qualitative manner, making it difficult to interpret the results.

Technical Problem

The present application aims to describe complex diseases with genomic heterogeneity by establishing a universal comprehensive quantitative parameter index from the perspective of genomic mutations, especially the intracellular deterministic event characteristics associated with expression activity of genes during tumor microevolution to distinguish different pathological and physiological states in diseases.

SUMMARY

A first aspect of the present application provides a method for acquiring intracellular deterministic events, executed by an electronic apparatus, and the method includes:
  acquiring, by the electronic apparatus, information of several mutant genes of a tested sample taken from a target object; and
  acquiring, by the electronic apparatus, data of comprehensive influence parameters of the several mutant genes on the expression activity of each gene in the predetermined genome based on the information of several mutant genes.

According to an embodiment, the step of acquiring data of comprehensive influence parameters of the several mutant genes on the expression activity of each gene in the predetermined genome includes:
  acquiring a driving force of each mutant gene in the several mutant genes on changing expression of each gene in the predetermined genome; and
  calculating a comprehensive driving force of the several mutant genes on changing expression of each gene based on the driving force of each mutant gene in the several mutant genes on changing expression of each gene in the predetermined genome.

According to an embodiment, the method further includes: acquiring data of statistical characteristic parameters for describing an overall distribution of the comprehensive influence parameter.

According to an embodiment, the data of statistical characteristic parameters for describing an overall distribution of the comprehensive influence parameter includes:
  a number of genes whose expression activity is influenced by the several mutated genes and meets a preset conditions among the genes in the predetermined genome; and/or
  a sum of absolute values, median, maximum value, and/or variance of each value in the data of comprehensive influence parameters.

According to an embodiment, the step of acquiring data of statistical characteristic parameters for describing an overall distribution of the comprehensive influence parameter includes:
  acquiring at least two simple data of statistical characteristic parameters for describing the data of comprehensive influence parameters; and
  acquiring composite data of statistical characteristic parameters based on the at least two simple data of statistical characteristic parameters.

According to an embodiment, the step of acquiring data of statistical characteristic parameters for describing an overall distribution of the comprehensive influence parameter includes:
  performing noise reduction processing on the data of comprehensive influence parameters of the several mutant genes on the expression activity of each gene in the predetermined genome; and acquiring data of statistical characteristic parameters for describing the overall distribution of the comprehensive influence parameter based on a result of the noise reduction process.

According to an embodiment, the predetermined genome corresponds to a predetermined pathological or physiological state, and the method further includes:

acquiring, by the electronic apparatus, at least one evaluation characteristic of the target object relative to the predetermined pathological or physiological state based on the data of comprehensive influence parameters of the several mutant genes on the expression activity of each gene in the predetermined genome.

According to an embodiment, acquiring, by the electronic apparatus, at least one evaluation characteristic of the target object relative to the predetermined pathological or physiological state based on data of a single comprehensive influence parameter or data of a single statistical characteristic parameter of the single comprehensive influence parameter of the several mutant genes on the expression activity of each gene in the predetermined genome.

According to an embodiment, the step of acquiring at least one evaluation characteristic of the target object relative to the predetermined pathological or physiological state includes:

predicting at least one treatment management factor characteristic of the target subject relative to the predetermined pathological or physiological state; and/or acquiring at least one retrospective analysis characteristic of the target subject relative to the predetermined pathological or physiological state; and/or acquiring a pathological or physiological state type label of the target object.

A further aspect of the present application provides an electronic apparatus, comprising: a memory, a processor, and a program stored in the memory, the program being configured to be executed by the processor, and the processor implementing the program when executing the method for acquiring intracellular deterministic events above-mentioned.

A yet further aspect of the present application provides a storage medium storing a computer program, when the computer program is executed by a processor, the method for acquiring intracellular deterministic events above-mentioned is implemented.

BENEFIT EFFECTS

In some embodiments of the present application, by effectively integrating global mutant information, a comprehensive quantitative index is established from the perspective of genomic mutation to describe intracellular deterministic event characteristics associated with gene expression activity in complex diseases or pathophysiological states (such as during tumor microevolution) with genomic heterogeneity.

According to some embodiments of the present application, a standardized statistical calculation method is used, and parameters such as "concerted effect" and "concerted effect burden" that are standardized and applicable to different tumor types are defined, and the complex and multivariate expression activity characteristic information is simplified as a single value, the complexity of the application of characteristic analysis in complex diseases or pathophysiological states with genomic heterogeneity (such as tumor microevolution) is reduced, and good prognostic assessment, mixed tumor type differentiation and other applications are achieved.

According to some embodiments of the present application, by establishing a multivariate correlation model between global mutation and gene expression activity, the discrete, high-dimensional, multivariate correlation, and non-standardized g global mutation characteristics are projected to the predicted gene expression characteristics of continuous value range, relatively low-dimensional, and the correlation gradually converges, establishing a quantitative model that converts discrete qualitative data into continuous space, and then acquiring a concerted effect burden parameter with an unique value through statistical algorithms, on the one hand, the global characteristics of the data are preserved, and on the other hand, characteristics associated with complex diseases or pathophysiological states with genomic heterogeneity (such as tumor microevolution) can be analyzed with a simple value, reducing the complexity of practical applications.

According to some embodiments of the present application, since concerted effect and concerted effect burden are parameters acquired by integrating global mutant information related to specific stages of tumor microevolution, the heterogeneity and genomic instability of specific evolutionary stages of tumors are comprehensively described. Therefore, it overcomes the problem of low coverage and penetrance in the combined analysis of single or several molecular markers. It can cover different types of tumors and realize the identification of tumor types according to the evolutionary characteristic difference of different types of tumors, and because of the prediction of prognosis and other characteristics related to tumor microevolution, which provides a basis for determining of "different treatments for same disease" and "same treatment for different diseases".

According to some embodiments of the present application, since the concerted effect and concerted effect burden parameters integrate global mutant information, the problem of low specificity of single or few molecular marker combinations and inability to distinguish mixed tumors can be solved, and good differentiation of different types of tumors can be achieved.

According to some embodiments of the present application, the specific calculation methods and definitions are clarified, and the concerted effect and concerted effect burden parameters are used as global indicators to evaluate tumor characteristics, which avoids the shortcomings of inconsistent and qualitatively vague indicators such as TMB. The analytical application of correlation features provides standardized tools.

BRIEF DESCRIPTION OF THE DRAWINGS

In order to illustrate the technical solutions in the embodiments of the present application more clearly, the following briefly introduces the drawings that are used in the description of the embodiments. Obviously, the drawings in the following description are some embodiments of the present application. For those skilled in the art, other drawings can also be obtained from these drawings without any creative effort.

DETAILED DESCRIPTION

Figure 1:
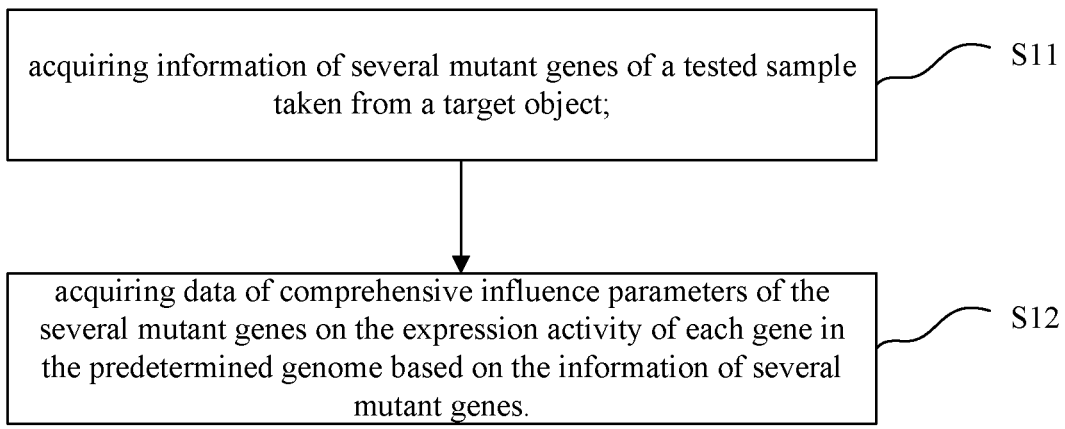
FIG. 1 is a schematic flowchart of a method for acquiring intracellular deterministic events according to an embodiment of the present application.

In order to make those skilled in the art better understand the solutions of the present application, the technical solutions in the embodiments of the present application will be clearly described below with reference to the accompanying drawings in the embodiments of the present application. Obviously, the described embodiments are some, but not all, embodiments of the present application. Based on the embodiments in the present application, all other embodiments acquired by those skilled in the art without creative work shall fall within the scope of protection of the present application.

The term "comprising" and any variations thereof in the description and claims of the present application and the above-mentioned drawings are intended to cover the non-exclusive inclusion. For example, a process, method or system, product or device including a series of steps or units is not limited to the listed steps or units, but optionally also includes unlisted steps or units, or optionally also includes other steps or units inherent in the process, method, product or device. Also, the terms "first," "second," and "third," etc. are used to distinguish between different objects, rather than to describe a particular order. The term "plurality" refers to two or more instances.

In the present application, the intracellular deterministic events refer to the interaction of various molecules in an organism according to known or unknown mechanisms, resulting in event characteristics that can be detected qualitatively or quantitatively by various methods, including but not limited to changes in gene expression activity, activation or inhibition of signaling pathways, changes in the types and content of metabolites, the interaction mode among biomolecules (including macromolecules such as proteins/nucleic acids, lipids/small molecule drugs/metabolites/inorganic metal ions and other small molecules), state and its changes, the structure of polymers/cells/organs and its changes, etc. In the present application, the intracellular deterministic events include gene expression activity determined by global mutant information, treatment management factors of diseases, and class characteristic labels of diseases, etc. The treatment and management factors of the disease may include, for example, the development and prognosis of the disease, pathophysiological characteristics (such as tumor metastasis site, risk of metastasis, etc.), clinical intervention effects (drug therapy, non-drug therapy, environmental exposure management, etc.), etc.

In the present application, a disease refers to a pathological or special physiological state that negatively affects the survival of biological individuals or the normal physiological functions of cells and tissues at a specific time point or period of time.

In the present application, tumor microevolution refers to the process of selecting progeny with malignant proliferation, distant metastasis and colonization ability through genome evolution during development, which is manifested in different degrees of tumor physiology and pathological progress.

FIG. 1 shows a schematic flowchart of a method for acquiring intracellular deterministic events according to an embodiment of the present application. The method can be executed by an electronic apparatus, including:

S11: acquiring, by the electronic apparatus, information of several mutant genes of a tested sample taken from a target object; and S12: acquiring, by the electronic apparatus, data of comprehensive influence parameters of the several mutant genes on the expression activity of each gene in the predetermined genome based on the information of several mutant genes.

In an embodiment, after acquiring data of comprehensive influence parameters of the several mutant genes on the expression activity of each gene in the predetermined genome, further includes: acquiring data of statistical characteristic parameters for describing the overall distribution of the comprehensive influence parameters.

In an embodiment, the data of statistical characteristic parameters for describing the overall distribution of the comprehensive influence parameters includes, but is not limited to: a number of genes whose expression activity is influenced by the several mutant genes and meets a preset conditions among the genes in the predetermined genome, and/or a sum of absolute values, a median, a maximum value, and/or a variance, etc. of values (not limited to these) in the data of comprehensive influence parameters.

In an embodiment, the step of acquiring data of statistical characteristic parameters for describing the overall distribution of the comprehensive influence parameters includes: acquiring at least two simple data of statistical characteristic parameters for describing the data of comprehensive influence parameters; and acquiring composite data of statistical characteristic parameters based on the at least two simple data of statistical characteristic parameters. Among them, the simple data of statistical characteristic parameters includes the number of genes whose expression activity is influenced by the several mutant genes and meets the preset conditions among the genes in the predetermined genome, and/or the sum of absolute values, the median, the maximum value, and/or the variance, etc. of values in the data of comprehensive influence parameters.

In the present application, the target object may be a living organism, such as but not limited to human beings. The tested sample can be a biological sample taken from the target object, mainly diseased tissue (also including but not limited to blood samples, other body fluids, exfoliated cells, tissue appendages, etc.).

Taking a human as an example, the predetermined genome can be, for example, part or all of the genes in the known human genome.

Several mutant genes of the target object can be global mutant information, for example, can be whole exome sequencing data, depending on the actual situation.

The global mutant information may refer to a set of mutant information carried in an individual genome and capable of identifying all mutant information different from a reference genome (for example, the aforementioned predetermined genome) by a selected criterion. It can be determined by detecting an individual sample of the target object. The tested individual sample can be a certain type of cell or a combination of different types of cells (such as tissue, hair and nails, etc.), and the types of mutations detected include but are not limited to point mutations, deletions or insertions of single bases or DNA fragments, copy number variations, chromosomal rearrangements, etc.

Among them, the reference genome can be a nucleic acid sequence database acquired and assembled by an authoritatively recognized organization from a paradigm sample set of a species (such as humans), representing all the genetic information of the genes of the species.

It can be understood that, in other embodiments, other high-pass global data can also be used to replace whole exome sequencing data, the high-pass global data includes such as but not limited to whole exome sequencing, whole genome sequencing, gene chip, expression chip, genotyping data, etc.

In the embodiment, by effectively integrating global mutant information, a comprehensive quantitative index is established from the perspective of genome mutation, to describe, for example, the characteristics of intracellular deterministic events related to gene expression activity during tumor microevolution.

Figure 2:
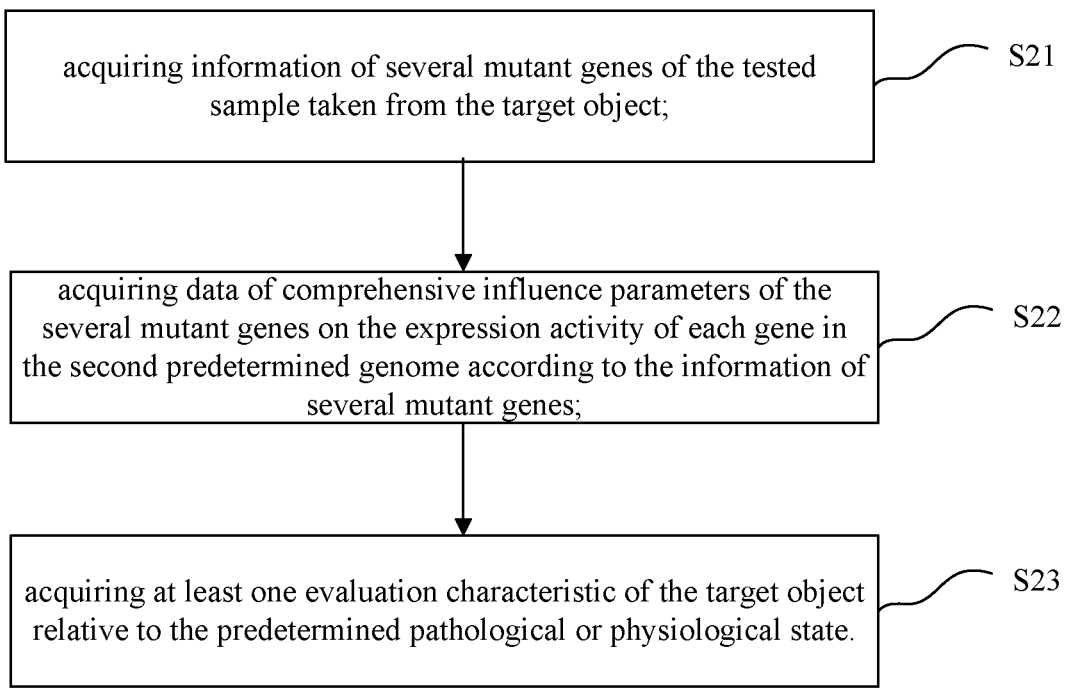
FIG. 2 is a schematic flowchart of a method for acquiring intracellular deterministic events according to another embodiment of the present application.

FIG. 2 shows a schematic flowchart of a method for acquiring intracellular deterministic events according to another embodiment of the present application, and the method can be executed by an electronic apparatus. In the embodiment, at least one evaluation characteristic of the target object relative to a predetermined pathological or physiological state can be acquired. The method of the embodiment includes:

S21: acquiring, by the electronic apparatus, information of several mutant genes of the tested sample taken from the target object, wherein the several mutant genes belong to a first predetermined genome.

Understandably, the mutant genes carried by different target objects are different.

S22: acquiring, by the electronic apparatus, data of comprehensive influence parameters of the several mutant genes on the expression activity of each gene in the second predetermined genome according to the information of several mutant genes, and the second predetermined genome is related to the predetermined pathological or physiological state.

S23: acquiring, by the electronic apparatus, at least one evaluation characteristic of the target object relative to the predetermined pathological or physiological state based on the data of comprehensive influence parameters of the several mutant genes on the expression activity of each gene in the second predetermined genome.

In the present application, the above-mentioned evaluation characteristics may include, but are not limited to, at least one treatment management factor characteristic in the evolution of a predetermined pathological state (such as a disease such as a tumor) or a change in a physiological state (such as cell differentiation), and/or a pathological or physiological state type labels, etc.

In the present application, tumor microevolution refers to the process by which the overall genetic background of a tumor changes over time leading to targeted changes in its adaptability due to the genetic instability of tumor cells and the heterogeneity of tumors (referring to tumor tissue as a collection of cells with distinct genomes) interacting with environmental screening.

Physiological state change refers to the process of specific changes in the specific functions or biological structures performed by cells, such as the differentiation of stem cells into specialized cells with different functions and shapes, or the process of dedifferentiation of some highly specialized cells.

In the present application, the aforementioned evaluation characteristic may also include, for example, at least one retrospective analysis characteristic of the target object relative to the predetermined pathological or physiological state.

In an example of the embodiment, the first predetermined genome may be the aforementioned global mutant information; the second predetermined genome corresponds to the cancer to be evaluated, for example, may be selected from the cancer-dependent gene map, but not limited to the set of observed genes for which the influence of the cancer assessed as described above meets the given criteria and enables the calculation of driving forces.

Among them, the Cancer Dependency Altas is gene collections that are strongly dependent on the growth and survival of cancer cells based on experimental experience. For example, it may include but not limited to the gene collections published in "Defining a Cancer Dependency Map. Cell, Volume 170, Issue 3, p 564-576.e16, Jul. 27, 2017. DOI: 10.1016/j. cell. 2017. 06. 010". It can be understood that different cancers have different dependent genes, and a corresponding cancer-dependent gene Altas can be selected according to the cancer to be evaluated.

In an embodiment, at least one evaluation characteristic of the target object relative to the predetermined pathological or physiological state can be acquired based on data of a single comprehensive influence parameter of several mutant genes on the expression activity of each gene in the predetermined genome or data of a single statistical characteristic parameter of the single comprehensive influence parameter. In this way, using simple data for analysis can reduce the complexity of data processing and improve evaluation efficiency.

It can be understood that, in another embodiment, acquiring the data of comprehensive influence parameters of the several mutant genes on the expression activity of each gene in the predetermined genome described in the present application also includes the situation that acquiring two or more two or more data of comprehensive influence parameters of the several mutant genes on the expression activity of each gene in the predetermined genome, which depends on the actual needs.

The method for acquiring the intracellular deterministic events in the embodiment of FIG. 2 will be described in detail below by way of example. The method of the example includes:

S31: acquiring, by the electronic apparatus, m1 mutant gene information of the tested sample taken from the target object, wherein the m1 mutant genes belong to the first predetermined genome.

S32: acquiring, for each gene in the second predetermined genome corresponding to the predetermined pathological or physiological state by the electronic apparatus, concerted effect parameter data of the m1 mutant genes on the expression activity of each gene in the second predetermined genome according to the m1 mutant gene information, and the number of genes in the second predetermined genome is m2.

In the present application, the concerted effect (CE) parameter may be used to represent the comprehensive influence of several mutant genes on the expression activity of any gene in the predetermined genome. The CE parameters can be a quantitative indicator that characterizes the statistical significance of the sum total of the expression activity of any gene in the individual sample (such as a tumor tissue sample, a tumor cell, or another form of tissue or cell combination and its environmental carrier, tissue epiphytes, etc.) of the target subject being influenced by the global mutation information carried in the predetermined genomic DNA (such as, but not limited to, the aforementioned reference genome) of the individual sample, to reflect, for example, the characteristics of intracellular deterministic events associated with gene expression activity at a certain stage in tumor microevolution. Taking tumors as an example, we can evaluate the CE of the somatic mutant information carried by the tumor genome of each mutant cell. The CE describes a measure of the concerted effect in the regulation direction of all or part of the gene expression in the current tumor genome as a whole, reflecting the tumor genome's preference for driving gene expression in cells at this time.

S33: acquiring at least one evaluation characteristic of the target object relative to the predetermined pathological or physiological state based on the CE parameter data of the expression activity of the several mutant genes for each of the genes.

Figure 3:
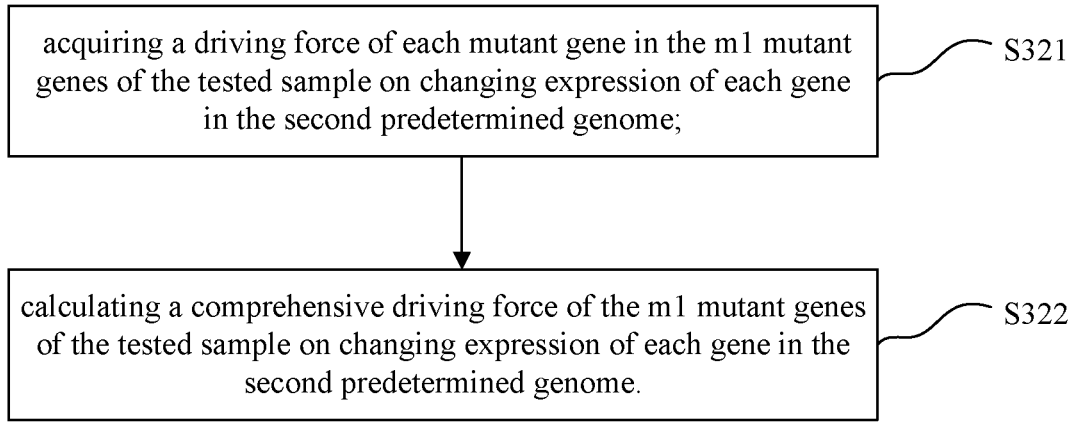
FIG. 3 is a schematic flowchart of acquiring CE parameter data according to another embodiment of the present application.

Referring to FIG. 3, in one embodiment, in S32, the step of acquiring CE parameter data of the expression activity of m1 mutant genes for each gene in the second predetermined genome includes:

S321: acquiring a driving force of each mutant gene in the m1 mutant genes of the tested sample on changing expression of each gene in the second predetermined genome; and S322: calculating a comprehensive driving force of the m1 mutant genes of the tested sample on changing expression of each gene in the second predetermined genome.

In the present application, the driving force can refer to, under the conditions of comparing a specified gene X with and without a mutation, the normalized score (Z-score) acquiring after normalizing the difference value of the expression activity of any observed gene Y after comparing the results of its random distribution, that is, the driving force of the specified gene X on the observed gene Y, which is used to measure the influence of the specified gene on the expression activity of any observed gene when it is mutated.

In one embodiment, in S321, the step of acquiring a driving force of each mutant gene in the m1 mutant genes of the tested sample on changing gene expression of each gene in the second predetermined genome includes:

acquiring a driving force of each mutant gene in the m1 mutant genes of the tested sample on changing gene expression of each gene in the second predetermined genome from simple data of a tested sample acquired in advance; wherein the simple data includes a driving force for changing gene expression for each gene in the third predetermined genome when each gene in the third predetermined genome is mutated.

In the present application, the third predetermined genome may be the same as or different from the first predetermined genome. In one embodiment, the third predetermined genome is the aforementioned reference genome, and both the first predetermined genome and the second predetermined genome are subsets of the third predetermined genome.

In the present application, gene expression refers to the amount of RNA products transcribed or the amount of translated proteins from a detectable gene on the genome, and the amount of gene expression can be a value in a continuous range, which can be acquired from existing data.

In one embodiment of the present application, the method for acquiring the sample data includes: performing following processing on each gene $g_i$ in the third predetermined genome:

S3211: dividing predetermined reference cell lines into a first cell line group and a second cell line group, wherein the first cell line group includes reference cell lines including the mutant gene $g_i$ in the predetermined reference cell lines, the second cell line group includes reference cell lines that do not include the mutant gene $g_i$ in the predetermined reference cell lines.

S3212: for each gene $g_j$ in the third predetermined genome, acquiring difference information between average gene expression information of the mutant gene $g_j$ of the reference cell line in the first cell line group and average gene expression information of the mutant gene $g_j$ of the reference cell line in the second cell line group.

S3213: performing noise reduction processing on the difference information.

A specific example is used for description as following:

Letting the number of genes in the third predetermined genome be n and the number of reference cell lines be p, for each gene $g_i$ in the third predetermined genome, the p reference cell lines are divided into two groups: the first cell line group (also called mutant group) $mt_i$ and the second cell line group (also called wild group) $wt_i$, where the first cell line group includes reference cell lines including genes $g_i$ in the p reference cell lines (let the number be $p_{i1}$), the second cell line group includes reference cell lines that do not include genes $g_i$ in the p reference cell lines (set the number to be $p_{i2}$).

Then for each gene $g_j$ in the third predetermined genome, calculating the difference information between the average gene expression information of the gene $g_j$ of the $p_{i1}$ reference cell lines in the first cell line group and the average gene expression information of the gene $g_j$ of the $p_{i2}$ reference cell lines in the second cell line group; specifically, difference de between a mean value of the gene expression values of the genes $g_j$ of the $p_{i1}$ reference cell lines in the first cell line group and a mean value of the gene expression values of the genes $g_j$ of the $p_{i2}$ reference cell lines in the second cell line group:

$$de_{ij} = \mu_{mtij} - \mu_{wtij}$$

where $de_{ij}$ represents the difference between the mean value of the gene expression values of the genes $g_j$ of each reference cell line in the mutant group $mt_i$ corresponding to the gene $g_i$ and the mean value of the gene expression values of the genes $g_j$ of each reference cell line in the wild group $wt_i$; $\mu_{mtij}$ represents the mean value of the gene expression values of the genes $g_j$ of each reference cell line in the mutant group $mt_i$; $\mu_{mtij}$ represents the mean value of the gene expression values of the genes $g_j$ of each reference cell line in the wild group $wt_i$.

Further, noise reduction processing may be performed on the difference value $de_{ij}$.

In one embodiment, random simulations may be performed a predetermined number of times (for example, but not limited to 10,000 times). In each simulation, p cell lines are randomly divided into the mutant group and the wild group, to maintain the number of reference cell lines in the mutant group being $p_{i1}$, and the number of reference cell lines in the wild group being $p_{i2}$. Then calculating the difference $de_{null}$ of the mean values of the expression values of each gene $g_i$ in the randomly divided two groups.

After that, use the difference value $de_{null}$ acquired from each random simulation to perform noise reduction processing (also called normalization processing) on $de_{ij}$, and the value acquired after normalization processing is the driving force df. This normalization processing can be achieved by the following formula:

$$df_{ij} = \frac{de_{ij} - \text{mean}(de_{null})}{\text{std}(de_{null})}$$

where $df_{ij}$ represents the driving force information for the gene $g_i$ to change the gene expression of the gene $g_j$. $\text{mean}(de_{null})$ and $\text{std}(de_{null})$ are the mean value and standard deviation of $de_{null}$ calculated for 10,000 random simulations, respectively.

The above process is to calculate he driving force that changes the gene expression of each gene $g_j$ when the gene $g_i$ is mutated. For the n genes in the third predetermined genome, the above calculation process is performed to acquire the driving force information for the gene expression change of each gene in the third predetermined genome when each gene in the third predetermined genome is mutated, that is the sample data. In one embodiment, the sample data can be represented by an n*n matrix, each row of the matrix corresponds to a gene $g_i$, each column corresponds to a gene $g_j$, and each value in the matrix represents the driving force for the change in gene expression of the gene in the column when the gene in the row is mutated.

In one embodiment, determining the driving force information of each mutant gene in the m1 mutant genes of the tested sample on changing gene expression of each gene in the second predetermined genome may include: extracting the row m1 and column m2 data corresponding to the m1 mutant genes and the m2 genes of the second predetermined genome from the above n*n matrix, the extracted data can be represented by an m1*m2 matrix.

Afterwards, each column of the m1*m2 matrix is averaged to acquire the comprehensive driving force of each mutant gene in the m1 mutant genes of the tested sample on changing gene expression of each gene in the second predetermined genome. The mean value can be used as the above-mentioned CE indicator, which can be represented by a 1*m2 matrix.

It can be understood that the comprehensive driving force of each mutant gene in the m1 mutant genes of the tested sample on changing gene expression of each gene in the second predetermined genome is not limited to the above-mentioned averaging of each column, and the comprehensive driving force is mathematical function of the driving force of each mutant gene in the m1 mutant genes of the tested sample on changing gene expression of each gene in the second predetermined genome, so in other embodiments of the present application, it can also be determined by other suitable methods to calculate the comprehensive driving force, such as sum of absolute values, median, maximum value, and/or variance, etc.

Figure 4:
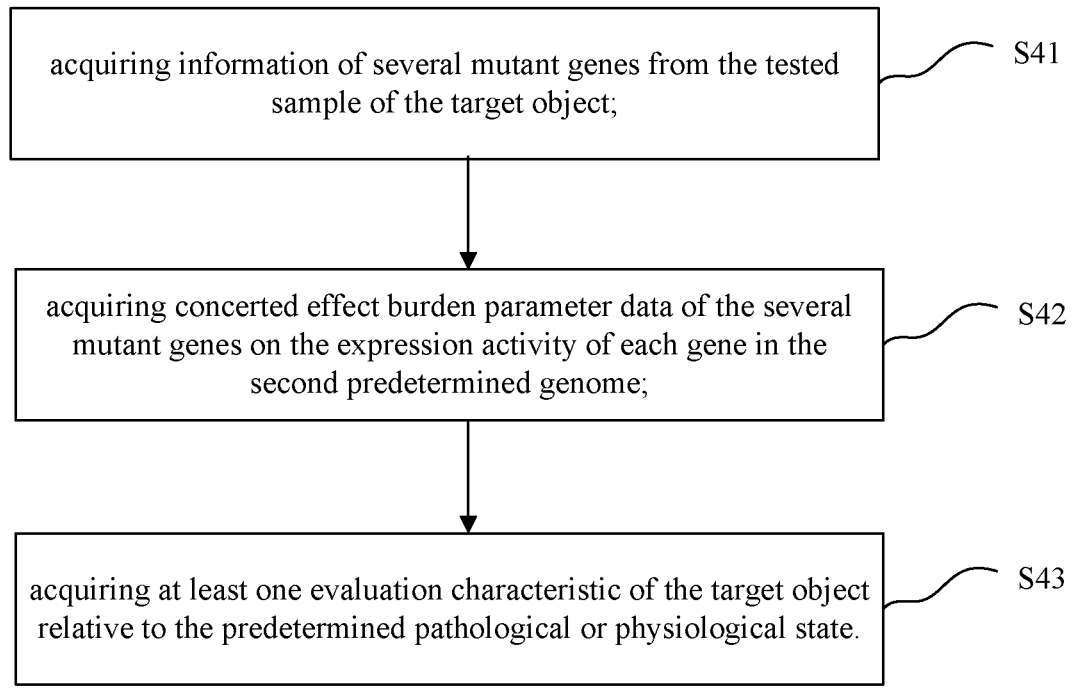
FIG. 4 is a schematic flowchart of a method for acquiring intracellular deterministic events according to another embodiment of the present application.

FIG. 4 shows a schematic flowchart of a method for acquiring intracellular deterministic events according to another embodiment of the present application, and the method can be executed by an electronic apparatus. In the embodiment, evaluating at least one characteristic of the target object relative to the predetermined pathological or physiological state based on concerted effect burden parameter of several mutated genes in the tested sample of the target object on the expression activity of each gene in a predetermined genome corresponding to a predetermined pathological or physiological state. The method of this embodiment includes:

S41: acquiring, by the electronic apparatus, information of several mutant genes from the tested sample of the target object (for ease of explanation and understanding, it is assumed that the number of mutant genes of the target object is m1), wherein the several mutant genes belong to the first predetermined genome.

S42: acquiring, according to the information of the several mutant genes by the electronic apparatus, concerted effect burden parameter data of the several mutant genes on the expression activity of each gene in the second predetermined genome, wherein the second predetermined genome corresponds to the predetermined pathological or physiological state. For the convenience of explanation and understanding, it is assumed that the number of genes in the second predetermined genome is m2.

In the present application, the concerted effect burden (CEB) parameter can be used to describe the statistical characteristics of the overall distribution of the CE parameter of the target object. The CEB can be the result of inductive simplification of the overall characteristics of the set of the CE values of all genes. Taking tumors as an example, the CEB describes a measure of the CE in the direction of variation occurring within the current tumor genome in driving downstream intracellular functional events, reflecting the tumor genome's preference in determining the evolution of cellular functions at this time.

S43: acquiring, by the electronic apparatus, at least one evaluation characteristic of the target object relative to the predetermined pathological or physiological state based on the concerted effect burden parameter data of the several mutant genes on the expression activities of all genes in the second predetermined genome.

In one embodiment, the CEB parameter data of the m1 mutant genes of the tested sample on expression activity of each gene in the second predetermined genome includes: a number of genes whose expression activity is influenced by the m1 mutant genes and meets a preset conditions among the genes in the predetermined genome; and/or a sum of absolute values, a median, a maximum value, and/or a variance, etc. of values in the CE parameter data of the m1 mutant genes of the tested sample on expression activity of each gene in the second predetermined genome.

In one embodiment, the CEB parameter data of the m1 mutant genes of the tested sample on expression activity of each gene in the second predetermined genome includes: acquiring at least two simple CEB parameter data of the m1 mutant genes of the tested sample on expression activity of each gene in the second predetermined genome; and acquiring composite CEB parameter data based on the at least two simple CEB parameter data. Among them, the simple CEB parameter data may be the number of genes whose expression activity is influenced by m1 mutated genes and meets the preset condition in the aforementioned second predetermined genome, or the sum of absolute values, the median, the maximum value, and/or the variance, etc. of values in the CE parameter data of the m1 mutant genes of the tested sample on expression activity of each gene in the second predetermined genome.

In one embodiment, in step S42, the concerted effect burden parameter data of several mutant genes on the expression activity of each gene in the second predetermined genome can be acquired by the following method:

S421: for each gene in the second predetermined genome corresponding to the predetermined pathological or physiological state, acquiring the CE parameter data of the several mutant genes on the expression activity of each gene according to the information of the several mutant genes. In a specific embodiment, the CE parameter data may be represented by a 1*m2 matrix.

For the implementation of S421, reference may be made to the description about S32 in the embodiment of FIG. 3, which is not repeated herein.

S422: performing noise reduction processing on the CE parameter data of the several mutant genes on expression activity of each gene.

S423: acquiring the concerted effect burden parameter data of the several mutant genes on expression activity of each gene in the second predetermined genome based on a result of performing the noise reduction processing.

In one embodiment, in S422, the noise reduction processing specifically includes acquiring a standard score Z-score of the CE.

In one embodiment, the standard score Z-score may be a number of symbols of the standard deviation of the observed value above the mean value of the observed values, and is used to measure the statistical significance of the deviation of the observed value from the mean value.

In one embodiment, the standard score Z-score for the CE can be acquired by the following method.

S4221: performing random simulations for a predetermined number of times (for example, but not limited to 10,000 times). In each simulation, a group of m1 simulated mutant genes is randomly generated, and then the group of simulated mutant genes is regarded as several mutant genes described in S421, and the above-mentioned processing in S421 is performed to acquired the CE parameter data $CE_{null}$ for this simulation, similarly, $CE_{null}$ can also be represented by a 1*m2 matrix.

In one embodiment, a group of m1 mutant genes in one simulation can be generated by the following method: for each mutant gene m1i in the m1 mutant genes of the target object, determining the genes in the fourth predetermined genome whose relationship with the mutant gene m1i meets the predetermined condition, and then randomly selecting one of the determined genes. The fourth predetermined genome may be the same as the third predetermined genome or a subset of the third predetermined genome.

Among them, determining the genes in the fourth predetermined genome whose relationship with the mutant gene m1i meets the predetermined condition can include: determining, in the fourth predetermined genome, the genes whose global driving force (GDF) is similar to (for example, but not limited to, the absolute value of the difference is less than a predetermined threshold) that of the mutant gene m1i.

In the present application, the GDF of a specified gene represents the influence on the expression activity of all genes in the third predetermined genome when the gene is mutated.

In one embodiment, the GDF of the specified gene can be acquired based on the driving force that meets the predetermined condition among the driving forces of the specified gene to all genes in the third predetermined genome. For example, in one embodiment, the GDF of the specified gene may be the sum of the absolute values of the driving forces of the specified gene for all genes in the third predetermined genome whose absolute value is greater than a selected threshold (for example, greater than 3).

S4222: performing noise reduction processing (also called normalization processing) on the CE parameter acquired in S421 by using the CE parameters $CE_{null}$ acquired in each simulation in S4221, and the value acquired after the normalization processing may be referred to the standard score (Z-score) of the CE parameter. The normalization process can be achieved by the following formula:

$$Z = \frac{CE - \text{mean } (CE_{null})}{\text{std } (CE_{null})}$$

Among them, Z represents the standard score Z-score, mean($CE_{null}$) and std($CE_{null}$) are the mean value and standard deviation of $CE_{null}$ calculated by random simulation for a predetermined number of times (for example, but not limited to 10,000 times).

The standard score Z-score of the CE parameter of the target object can also be represented by a 1*m2 matrix. The value of each column in the matrix is the mean value of a driving force of m1 mutant genes on changing gene expression of the corresponding gene in the second predetermined genome after noise reduction processing.

In one embodiment, the CEB parameter data of the several mutant genes on the expression activity of the each gene in the second predetermined genome based on the result of performing the noise reduction process in S423 can be acquired in the following method: determining the number of values that meet a predetermined condition (for example, the absolute value is greater than 3) as the CEB parameter data from the values of each column of the 1*m2 matrix of the standard score Z-score of the CE parameter.

Figure 5:
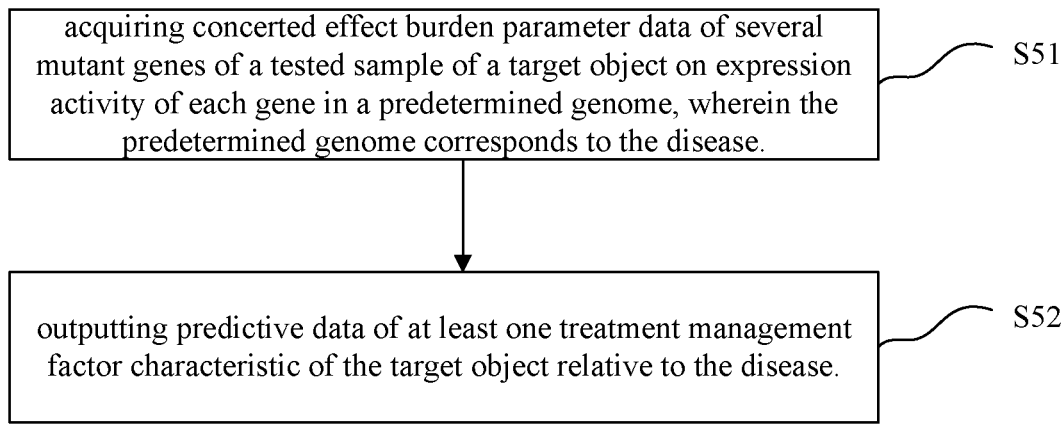
FIG. 5 is a schematic flowchart of a method for automatically predicting treatment management factor characteristics of a disease according to an embodiment of the present application.

The present application further provides a method for automatically predicting treatment management factor characteristics of a disease. FIG. 5 shows the method for automatically predicting treatment management factor characteristics of a disease according to an embodiment of the present application, which can be executed by an electronic apparatus. Referring to FIG. 5, the prediction method of the embodiment includes:

S51: acquiring, by the electronic apparatus, concerted effect burden parameter data of several mutant genes of a tested sample of a target object on expression activity of each gene in a predetermined genome, wherein the predetermined genome corresponds to the disease.

In the embodiment, the concerted effect burden parameter data of several mutant genes of the target object on expression activity of each gene in the predetermined genome can be directly calculated locally on the electronic apparatus, or can be calculated and acquired by other devices and then provided to the electronic apparatus. The process of calculating and acquiring the concerted effect burden parameter data may be implemented with reference to the relevant content in the foregoing embodiments, and details are not described herein again.

In the present application, the target object may be a patient suffering from the disease, and the tested sample may be a diseased tissue taken from the patient suffering from the disease, for example, but not limited to cancer.

S52: outputting, by the electronic apparatus, predictive data of at least one treatment management factor characteristic of the target object relative to the disease based on the concerted effect burden parameter data.

In one embodiment, the at least one treatment management factor characteristic of the target object relative to the disease includes survival data (such as, overall survival) of the target object suffering from the disease. It can be understood that the present application is not limited to this, for example, the treatment management factor characteristics may also include pathophysiological characteristics (such as tumor metastasis site, risk of metastasis, etc.), clinical intervention effect (drug therapy, non-drug therapy, environmental exposure management, etc.) characteristics.

In one embodiment, outputting predictive data of at least one treatment management factor characteristic of the target object relative to the disease based on the concerted effect burden parameter data includes: comparing the concerted effect burden data of the target object with a preset concerted effect burden-survival mode model of the disease, and outputting a survival mode label of the target object relative to the disease.

In the present application, the survival mode label may include, but is not limited to, data (such as 1) indicating long survival period or data (such as 0) indicating short survival period, and/or data indicating survival years and corresponding survival probability, and/or confidence coefficient parameter prediction results, etc.

In one embodiment, the step of outputting predictive data of at least one treatment management factor characteristic of the target object relative to the disease based on the concerted effect burden parameter data includes: outputting predictive data of the target object relative to the predetermined treatment management factor characteristics based on the concerted effect burden data of the target object, concerted effect burden data of several pre-acquired modeling samples, and measured data of the predetermined treatment management factor characteristics. For example, in addition to the aforementioned comparison with the preset concerted effect burden-survival mode model, other statistical methods and parameters can also be used to make predictions according to the distribution characteristics and application scenarios of the data.

In one embodiment, the several modeling samples are from several patients suffering from the disease, for example, the several modeling samples are from primary lung tumor tissue of a lung cancer patient.

In one embodiment, the several modeling samples are from several patients suffering from the disease and at a specified evolutionary stage of the disease, for example, the several modeling samples are from lung metastatic tumor tissue from a patient suffering from gastrointestinal cancer.

Figure 6:
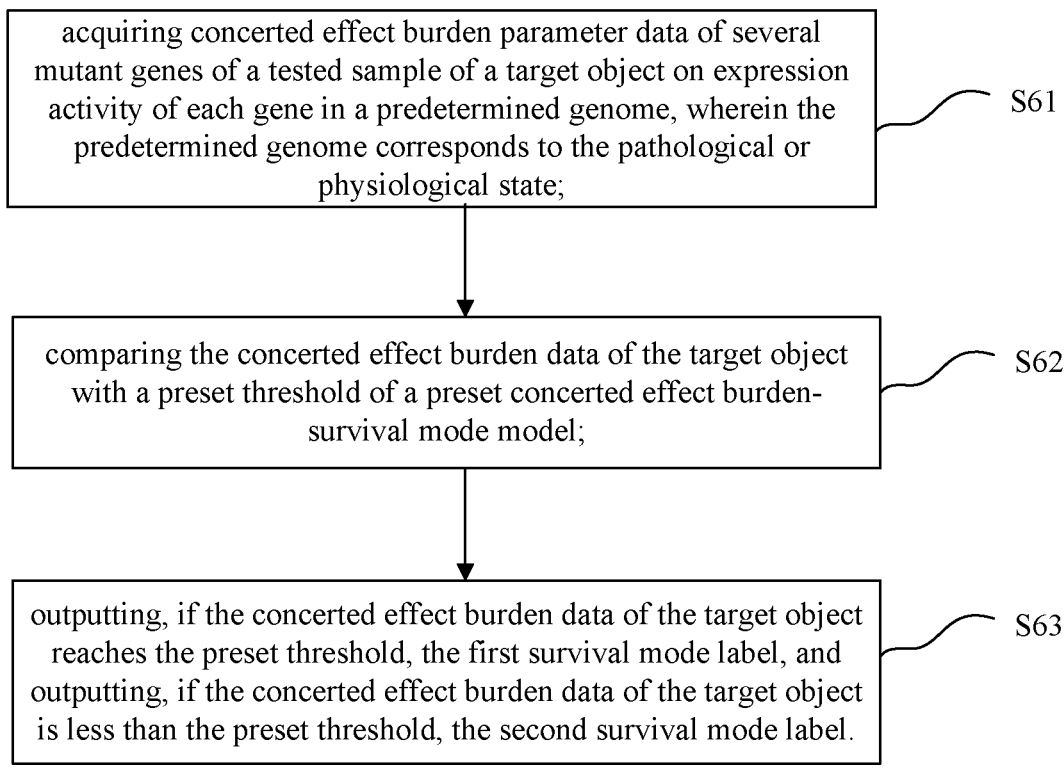
FIG. 6 is a schematic flowchart of a method for automatically predicting treatment management factor characteristics of a disease according to another embodiment of the present application.

FIG. 6 shows a method for automatically predicting treatment management factor characteristics of a disease according to another embodiment of the present application, which is executed by an electronic apparatus. In the embodiment, the prognosis of cancer is used as an example for description, but it can be understood that the present application is not limited to this. Referring to FIG. 6, the prediction method of the embodiment includes:

S61: acquiring, by the electronic apparatus, concerted effect burden parameter data of several mutant genes of a tested sample of a target object on expression activity of each gene in a predetermined genome, wherein the predetermined genome corresponds to the pathological or physiological state.

In one example, the target object may be a patient suffering from a specific cancer (such as lung adenocarcinoma), the tested sample may be a lung adenocarcinoma tissue taken from the patient, and the predetermined genome may be observable genomes corresponding to lung adenocarcinoma selected from, for example, a cancer-dependent gene map.

For the acquisition of the concerted effect burden parameter data, reference may be made to the corresponding description in the corresponding embodiment of FIG. 5, and details are not repeated here.

S62: comparing the concerted effect burden data of the target object with a preset threshold of a preset concerted effect burden-survival mode model by the electronic apparatus.

S63: outputting, if the concerted effect burden data of the target object reaches the preset threshold, the first survival mode label, and outputting, if the concerted effect burden data of the target object is less than the preset threshold, the second survival mode label.

The inventor of the present application used the Cox proportional hazards regression model to study the effect of the CEB parameter on the overall survival (OS) of cancer patients. The results showed that the overall survival of cancer patients with low CEB was significantly ($p=6*10^{-16}$) longer than that of cancer patients with high CEB. It can be understood that in other embodiments, other statistical models can also be used for evaluation.

Based on this, in one embodiment, a preset concerted effect burden-survival mode model is used to predict the survival mode of the target object.

In one embodiment, the concerted effect burden-survival pattern model for a specified disease can be established by: acquiring CEB parameter data and corresponding patient survival data for a modeling sample of several patients suffering from the disease; acquiring the median of the CEB parameter data of each modeling sample, and the median is used as a predetermined threshold to establish the concerted effect burden-survival mode model.

Figure 7:
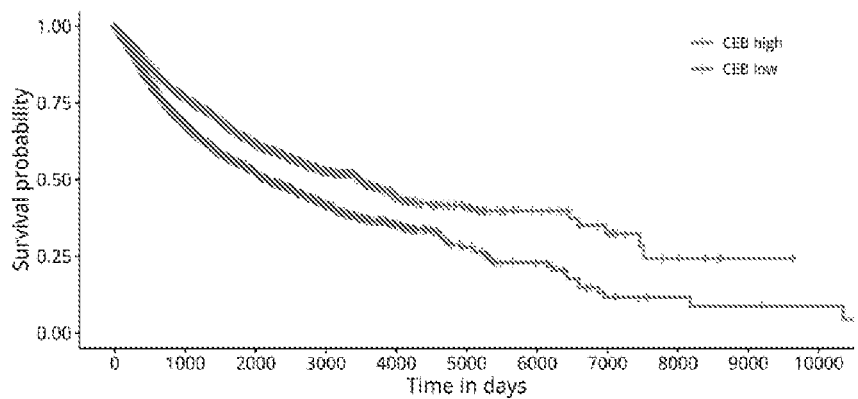
FIG. 7 is a concerted effect burden-survival curve graph generated by dividing modeling samples into two groups according to the concerted effect burden.

In an example, when establishing the concerted effect burden-survival mode model, the median can be used as a boundary, and the modeling samples with CEB data greater than or equal to the median are divided into a first group, and the modeling samples with the CEB data less than the median are divided into a second group; wherein, the first group has a first survival mode label, and the survival mode label may include, but is not limited to, data indicating a short survival period (such as 0), and/or data indicating survival years and corresponding survival probability, etc.; the second group has a second survival mode label, and the survival mode label can be, for example, data indicating a long survival period (such as 1), and/or data indicating survival years and corresponding survival probability, and/or the prediction result of the confidence coefficient parameter, etc., it can be understood that the survival mode label can also be other suitable data. FIG. 7 shows the concerted effect burden-survival curves generated by dividing the modeling samples into two groups according to CEB. In the figure, the horizontal axis represents the survival period, and the vertical axis represents the survival probability, among them, the lower curve represents the survival data of the modeling samples with CEB above the median, and the higher curve represents the survival data of the modeling samples with CEB below the median. It can be seen that the survival modes can be distinguished and predicted using CEB.

It can be understood that, in other embodiments, statistical methods can also be used to select other statistics than the median of CEB as the predetermined threshold of the concerted effect burden-survival mode model. For example, statistics such as mean and mode, or composite parameters of simple statistics, such as mean-variance ratio, etc.

It can be understood that, in other embodiments, the concerted effect burden-survival mode model may also have a plurality of different thresholds, and a plurality of survival mode labels are set based on the plurality of thresholds.

For example, three survival mode labels of long, medium and short may be set by a small threshold and a large threshold. In this case, in S62, the step of comparing the concerted effect burden data of the target object with a preset threshold of a preset concerted effect burden-survival mode model includes: the case of comparing the concerted effect burden data of the target object with a plurality of preset thresholds of the preset concerted effect burden-survival mode model. In S63, the step of outputting the first survival mode label if the concerted effect burden data of the target object reaches the preset threshold, and outputting the second survival mode label if the concerted effect burden data of the target object is less than the preset threshold includes: outputting the short survival mode label if the concerted effect burden data of the target object reaches a larger threshold, and if the concerted effect burden data of the target object is less than the larger threshold, then outputting the long survival mode label if the concerted effect burden data of the target object is less than the smaller threshold, otherwise, outputting the medium survival mode label.

Figure 8:
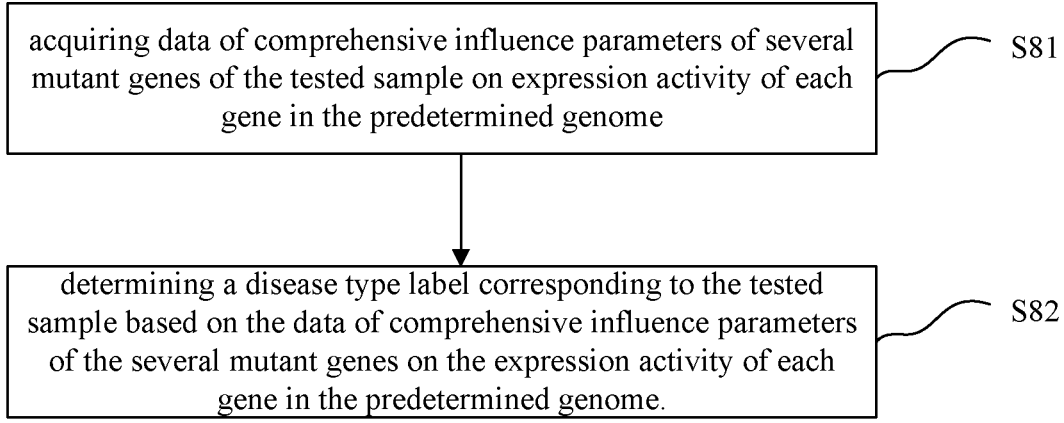
FIG. 8 is a schematic flowchart of a method for automatically determining a disease type according to an embodiment of the present application.

The present application also provides a method for automatically determining a disease type. FIG. 8 shows a method for automatically determining a disease type according to an embodiment of the present application, which can be executed by an electronic apparatus. Referring to FIG. 8, the method of the embodiment includes:

S81: acquiring, by the electronic apparatus, data of comprehensive influence parameters of several mutant genes of the tested sample on expression activity of each gene in the predetermined genome.

S82: determining, by the electronic apparatus, a disease type label corresponding to the tested sample based on the data of comprehensive influence parameters of the several mutant genes on the expression activity of each gene in the predetermined genome.

In the embodiment, in S81, the data of comprehensive influence parameters of several mutant genes of the tested sample on expression activity of each gene in the predetermined genome can be directly calculated locally on the electronic apparatus, or can also be calculated by other devices and provided to the electronic device. Among them, the process of calculating and acquiring the data of comprehensive influence parameters may be implemented by referring to the relevant content in the foregoing embodiments, and details will not be repeated here. In the present application, the comprehensive influence parameter may be represented by the CE parameter.

In one embodiment, the determining the disease type label corresponding to the tested sample includes: determining the disease type label corresponding to the tested sample from at least two disease type labels having evolutionary correlation.

In the embodiment, the disease with evolutionary correlations can refer to several types of diseases that are easily confused during the process of disease progression due to the existence of some specific states with similar lesions, metastatic pathways and sites, pathological features, biochemical features or tissue features. For example, lung cancer brain metastasis and primary brain cancer, gastrointestinal tumor lung metastasis and primary lung cancer, etc.

In the embodiment, the predetermined genome in S81 may be a genome corresponding to the above-mentioned at least two diseases with evolutionary correlation, for example, it may be, but is not limited to, the set of observed genes screened from the Cancer Dependent Gene Atlas whose effects on at least two evolutionarily related cancers meet the given criteria and which can calculate the driving force.

In the present application, the tested sample may be diseased tissue from a patient suffering from several evolutionary related mixed diseases, especially but not limited to cancer. For example, in a scenario, intrahepatic cholangiocarcinoma lesions and lung tumor lesions are detected in a patient at the same time, and it is necessary to determine whether it is intrahepatic cholangiocarcinoma with lung metastasis or combined with primary lung cancer, the tested sample can be taken from lung tumor tissue, using the method of this embodiment, the label corresponding to the tested sample can be determined from the intrahepatic bile duct cancer label and the lung cancer label.

For example, in another scenario, brain tumor lesions and lung tumor lesions are detected in a patient at the same time, and it is necessary to determine whether it is combined with primary brain cancer or lung cancer brain metastases, the tested sample can be taken from brain cancer tissue, using the method of this embodiment, the label corresponding to the tested sample can be determined from the brain cancer label and the lung cancer label.

In one embodiment, in S82, determining the disease type label corresponding to the tested sample based on the data of comprehensive influence parameters of the several mutant genes on the expression activity of each gene in the predetermined genome includes: imputing the data of comprehensive influence parameters of the tested sample into a preset classifier; and running the preset classifier, and outputting the disease type label corresponding to the tested sample from the label of the first disease type and the label of the second disease type through the preset classifier.

It can be understood that, in the embodiment of the present application, the preset classifier may be either a binary classifier or a multivariate classifier.

In one embodiment, the preset classifier is trained by at least the first modeling data set of the first modeling sample group and the second modeling data set of the second modeling sample group, wherein the first modeling samples are from a patient of the first disease type, the second modeling samples are from a patient of the second disease type, and the first modeling data set includes the label of the first disease type and the data of comprehensive influence parameters of several mutant genes of each first modeling sample on the expression activity of each gene in the first predetermined genome, and the second modeling data set includes the label of the second disease type and the data of comprehensive influence parameters of several mutant genes of each second modeling sample on the expression activity of each gene in the second predetermined genome, where the first predetermined genome corresponds to the first disease type, and the second predetermined genome corresponds to the second disease type.

In another embodiment, the preset classifier is trained by at least the first modeling data set of the first modeling sample group and the second modeling data set of the second modeling sample group, wherein the first modeling samples are from a patient of the first disease type, the second modeling samples are from a patient of the second disease type, and the first modeling data set includes the label of the first disease type and the data of comprehensive influence parameters of several mutant genes of each first modeling sample on the expression activity of each gene in the third predetermined genome, and the second modeling data set includes the label of the second disease type and the data of comprehensive influence parameters of several mutant genes of each second modeling sample on the expression activity of each gene in the third predetermined genome, wherein the third predetermined genome is a genome corresponding to the first disease and the second disease. Here, a binary classifier is used as an example to describe, it can be understood that when establishing a multivariate classifier, it can be trained from a plurality of modeling data sets of a plurality of modeling sample groups. The modeling samples of each sample group come from a patient with a disease type, each modeling data set includes the corresponding disease type label and the comprehensive influence parameter of several mutant genes of the modeling samples in the corresponding modeling sample group on the expression activity of each gene in the third predetermined genome, wherein the third predetermined genome is a genome corresponding to a plurality of disease types of a plurality of modeling sample sets.

In one embodiment, the preset classifier may be established by the following method: inputting the first modeling data set and the second modeling data set into a plurality of candidate classifier models respectively, and performing training to acquire a plurality of candidate classifier and parameter values of predetermined evaluation parameters of each of the candidate classifiers; and selecting the candidate classifier with a best parameter value of the predetermined evaluation parameters from the plurality of candidate classifiers as the preset classifier.

In one embodiment, the candidate classifier models may be selected from classifier models based on stochastic gradient boosting, support vector machines, random forests, neural networks, and the like.

Figure 9:
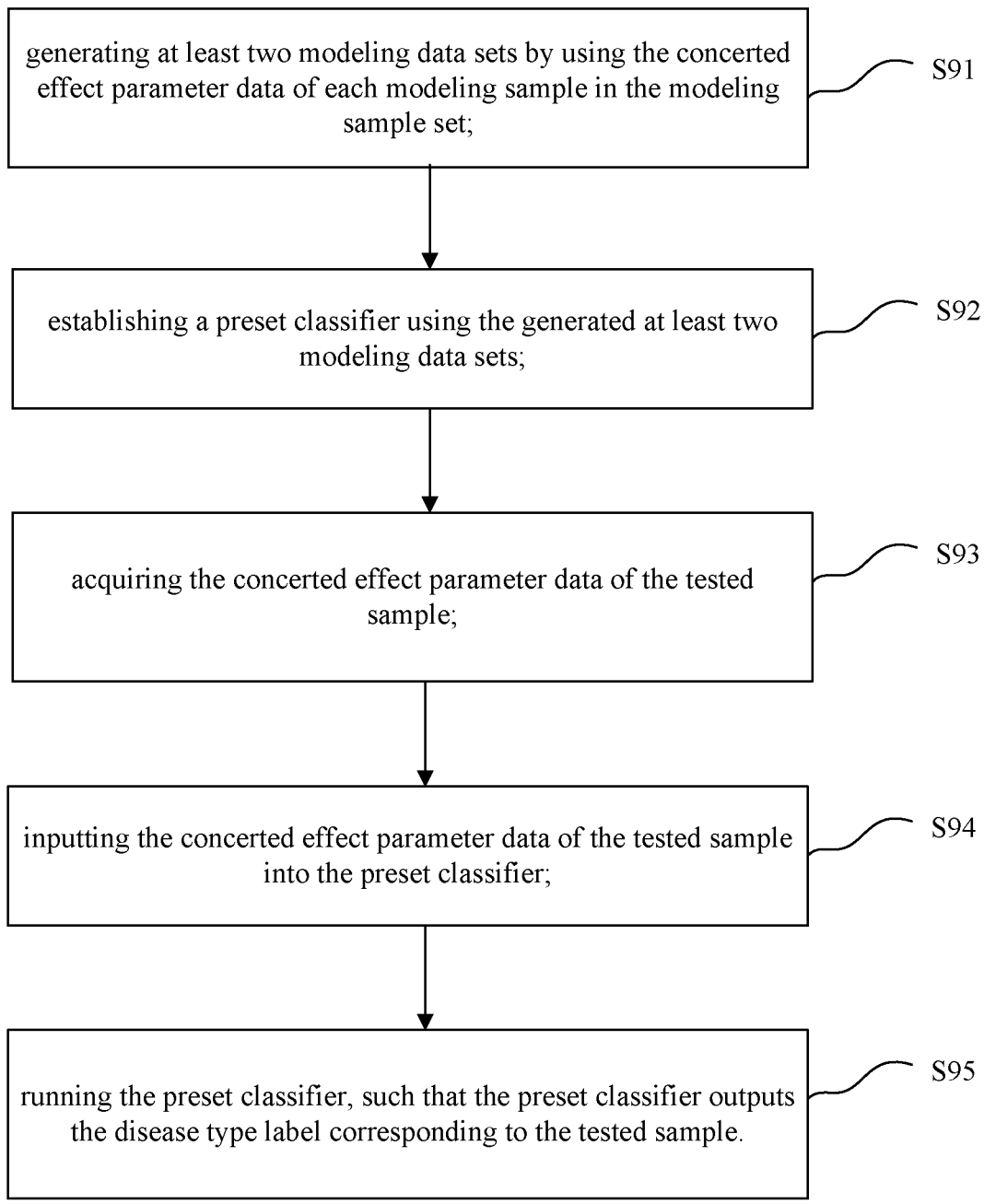
FIG. 9 is a schematic flowchart of a method for automatically determining a disease type according to another embodiment of the present application.

FIG. 9 shows a method for automatically determining a disease type according to another embodiment of the present application, which is executed by an electronic apparatus. For ease of understanding and description, in the embodiment, a binary classifier is used as an example for description, but it is understood that a multivariate classifier may also be used in other embodiments of the present application; in addition, in the embodiment, the comprehensive influence parameter of several mutant genes of the tested sample on the expression activity of each gene in the predetermined genome is described by taking the concerted effect parameter as an example, but it can be understood that other comprehensive influence parameters can also be used in other embodiments of the present application, or two or more comprehensive influence parameters can also be used; in addition, in the embodiment, tumor classification is used as an example for description, but it is understood that other suitable mixed disease classifications can also be performed in other embodiments of the present application. Referring to FIG. 9, the method of the embodiment includes:

S91: generating at least two modeling data sets by using the concerted effect parameter data of each modeling sample in the modeling sample set, wherein each modeling data set is provided with a corresponding tumor classification label.

In the embodiment, a set of modeling samples with tumor types as classification labels may be acquired from public databases (for example, including but not limited to the Tumor Genome Project TCGA database) and/or an autonomous sample base. After the modeling samples are acquired, the concerted effect parameter data of each modeling sample can be acquired according to the method described in the previous embodiment.

In one embodiment, the modeling sample set may include a first modeling sample group and a second modeling sample group, wherein each first modeling sample in the first modeling sample set is from a first tumor tissue of a patient with a first type of tumor label, and each second modeling sample in the second modeling sample set is from a second tumor tissue of a patient with a second type of tumor label. Acquiring the concerted effect parameter data of each of the first and second modeling samples can form a first modeling data set corresponding to the first modeling sample group and a second modeling data set corresponding to the second modeling sample group. The first modeling data set includes the first type of tumor label and the concerted effect parameter data of several mutant genes of each first modeling sample on the expression activity of each gene in the first predetermined genome, and the second modeling data set includes the second type of tumor label and the concerted effect parameter data of several mutant genes of each second modeling sample on the expression activity of each gene in the second predetermined genome. The first predetermined genome corresponds to the first tumor type, and the second predetermined genome corresponds to the second tumor type. In one embodiment, the modeling sample set may include a first modeling sample group and a second modeling sample group, wherein each first modeling sample in the first modeling sample set is from a first tumor tissue of a patient with a first type of tumor label, and each second modeling sample in the second modeling sample set is from a second tumor tissue of a patient with a second type of tumor label. Acquiring the concerted effect parameter data of each of the first and second modeling samples can form a first modeling data set corresponding to the first modeling sample group and a second modeling data set corresponding to the second modeling sample group. The first modeling data set includes the first type of tumor label and the concerted effect parameter data of several mutant genes of each first modeling sample on the expression activity of each gene in the third predetermined genome, and the second modeling data set includes the second type of tumor label and the concerted effect parameter data of several mutant genes of each second modeling sample on the expression activity of each gene in the third predetermined genome, wherein the third predetermined genome is a genome corresponding to the first tumor and the second tumor.

In one embodiment, as mentioned above, the concerted effect parameter data of one modeling sample can be represented by a 1*m2 matrix, then the matrix of each modeling sample of each modeling sample group can be composed together to form the CE characteristic matrix as part of the modeling data set, each row in the CE characteristic matrix is the data of one modeling sample. In this way, a corresponding CE characteristic matrix is established for each tumor type.

In another embodiment, the modeling sample set may include a plurality of modeling sample groups, and each of the modeling sample groups is provided a respective different tumor classification label. Acquiring concerted effect parameter data of each modeling sample in the modeling sample set can form a plurality of modeling data sets corresponding to a plurality of modeling sample groups one-to-one.

S92: establishing a preset classifier using the generated at least two modeling data sets.

When there are only two modeling data sets, a binary classifier can be established using the two modeling data sets.

When there are a plurality of modeling data sets, different binary classifiers can be established by pairing the plurality of modeling data sets, or corresponding multivariate classifiers can be established using a part or all of the plurality of modeling data sets, such as ternary, quaternary classifiers, etc.

In one embodiment, the preset classifier can be established by the following method: inputting each modeling data set (for example, the CE characteristic matrix of each modeling data set) and the corresponding tumor classification labels into a plurality of candidate classifier models respectively, acquiring the plurality of candidate classifiers and the parameter values of the predetermined evaluation parameters of each of the candidate classifiers after training, and selecting the candidate classifier with the optimal parameter value of the predetermined evaluation parameter from the plurality of candidate classifiers as the preset classifier. Among them, the candidate classifier model can be selected from classifier models based on random gradient enhancement, support vector machine, random forest and neural network. It can be understood that the present application is not limited to this, and in other embodiments, a known classifier model based on other technologies can also be selected as the candidate classifier model.

In one embodiment, AUC and/or F-score can be used as the predetermined evaluation parameter of the classifier, after completing training to acquire each candidate classifier and the parameter value corresponding to AUC and/or F-score, selecting the AUC, or F-score, or the best candidate classifier for the combination of the two, used as the preset classifier. It can be understood that in other embodiments of the present application, other evaluation parameters or combinations of parameters may also be used to determine the preset classifier.

In one embodiment, when training the classifiers, the data in each modeling data set may be randomly divided into a training group (such as 75%) and a test group (such as 25%), and cross-validation is used to search for optimal parameters of the classifiers.

It can be understood that, in one embodiment, the selected classifier model can also be used directly, each modeling data set and corresponding tumor classification labels are input into the selected classifier model, and a preset classifier can be acquired directly after training.

S93: acquiring the concerted effect parameter data of the tested sample.

The concerted effect parameter data of the tested sample can be acquired by referring to the relevant content in the foregoing embodiments, and details are not repeated here.

As an example, in a scenario where it is necessary to distinguish primary lung cancer from other gastrointestinal cancers (such as intrahepatic cholangiocarcinoma) with lung metastases, the concerted effect parameter data of several mutant genes of the patient taking from lung tumor tissue on the expression activity of each gene in a predetermined genome corresponding to for example, lung cancer and intrahepatic cholangiocarcinoma.

S94: inputting the concerted effect parameter data of the tested sample into the preset classifier.

For example, in a scenario where primary lung cancer needs to be differentiated from lung metastases from other digestive tract cancers (such as intrahepatic cholangiocarcinoma), the preset classifier is a classifier for distinguishing lung cancer from the digestive tract cancer, and the classifier can be Lung cancer-digestive tract cancer binary classifier established using a first modeling data set acquired based on lung tumor tissue samples of patients suffering from lung cancer and a second modeling data set acquired based on gastrointestinal tumor tissue samples of patients suffering from gastrointestinal cancer, the first classification label of the binary classifier is the lung cancer label, and the second classification label is the digestive tract cancer label.

S95: running the preset classifier, such that the preset classifier outputs the disease type label corresponding to the tested sample.

For example, the concerted effect parameter data of the tested sample is inputted into a lung cancer-digestive tract cancer classifier, and running the classifier to output a lung cancer label (such as 0) or a digestive tract cancer label (such as 1), so as to indicate whether the patient is a primary lung cancer or lung metastases from digestive tract cancer. It can be understood that the confidence coefficient parameter for making a lung cancer label or a digestive tract cancer label can also be output at the same time.

In one embodiment, the preset classifier may also output the confidence coefficient of the classified disease type label.

Figure 10:
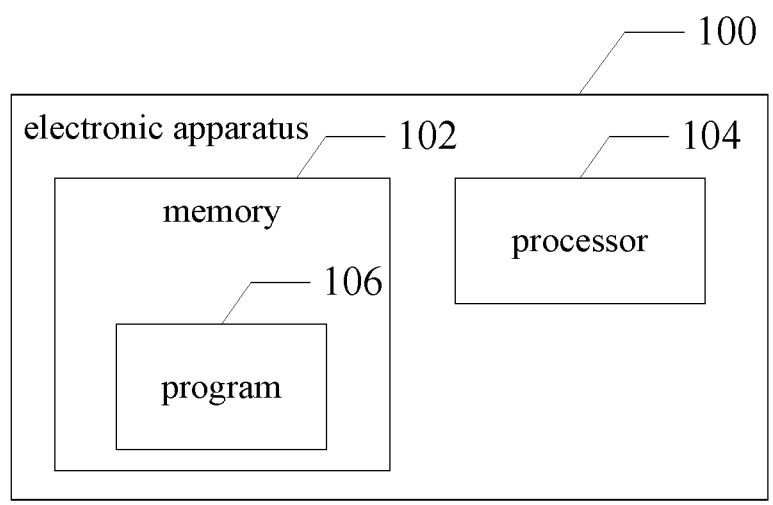
FIG. 10 is a schematic structural diagram of an electronic apparatus according to an embodiment of the present application.

FIG. 10 shows an electronic apparatus 100 according to an embodiment of the present application, including a memory 102, a processor 104, and a program 106 stored in the memory 102, the program 106 being configured to be executed by the processor 104, and when the processor 104 executes the program 106, a part or all of the aforementioned method for acquiring intracellular deterministic events are implemented, or a part or all of the aforementioned method for automatically predicting of treatment management factor characteristics of a disease are implemented, or a part or all of the aforementioned method for automatically determining of disease types are implemented, or a combination of the foregoing methods are implemented.

The present application also provides a storage medium storing a computer program, wherein, when the computer program is executed by a processor, a part or all of the aforementioned method for acquiring intracellular deterministic events are implemented, or a part or all of the aforementioned method for automatically predicting of treatment management factor characteristics of a disease are implemented, or a part or all of the aforementioned method for automatically determining of disease types are implemented, or a combination of the foregoing methods are implemented.

In some embodiments of the present application, by establishing a multivariate correlation model between global mutation and gene expression activity, the discrete, high-dimensional, multivariate correlation, and non-standardized g global mutation characteristics are projected to the predicted gene expression characteristics of continuous value range, relatively low-dimensional, and the correlation gradually converges, establishing a quantitative model that converts discrete qualitative data into continuous space, and then acquiring the concerted effect burden parameter with an unique value through statistical algorithms, on the one hand, the global characteristics of the data are preserved, and on the other hand, characteristics associated with complex diseases or pathophysiological states with genomic heterogeneity (such as tumor microevolution) can be analyzed with a simple value, reducing the complexity of practical applications.

In some embodiments of the present application, since concerted effect and concerted effect burden are parameters acquired by integrating global mutant information related to specific stages of tumor microevolution, the heterogeneity and genomic instability of specific evolutionary stages of tumors are comprehensively described. Therefore, it overcomes the problem of low coverage and penetrance in the combined analysis of single or several molecular markers. It can cover different types of tumors and realize the identification of tumor types according to the evolutionary characteristic difference of different types of tumors, and because of the prediction of prognosis and other characteristics related to tumor microevolution, which provides a basis for determining of "different treatments for same disease" and "same treatment for different diseases".

In some embodiments of the present application, since the concerted effect and concerted effect burden parameters integrate global mutant information, the problem of low specificity of single or few molecular marker combinations and inability to distinguish mixed tumors can be solved, and good differentiation of different types of tumors can be achieved.

In some embodiments of the present application, the specific calculation methods and definitions are clarified, and the concerted effect and concerted effect burden parameters are used as global indicators to evaluate tumor characteristics, which avoids the shortcomings of inconsistent and qualitatively vague indicators such as TMB. The analytical application of correlation features provides standardized tools.

In some embodiments of the present application, an input interface capable of accepting global variation information generated by different technologies (including but not limited to high-throughput data technologies such as whole-exome sequencing, whole-genome sequencing, and gene chip data) may be used; In addition, a multi-level deep learning neural network framework can be used to process global mutant information, and a data-knowledge hybrid-driven approach can be used to establish a transformation function between different types of intracellular deterministic event set features for projections suitable for different tumor types.

In some embodiments of the present application, the concerted effect and concerted effect burden parameters may be acquired by calculating through a simple network analysis method, or different types of machine learning methods, or different types of deep learning network methods.

The electronic apparatus may be a user terminal device, a server, or a network device, etc. in some embodiments. For example, mobile phones, smart phones, notebook computers, digital broadcast receivers, PDAs (Personal Digital Assistants), PADs (Tablets), PMPs (Portable Multimedia Players), navigation devices, in-vehicle devices, digital TVs, desktop computers, etc., a single A network server, a server group composed of a plurality of network servers, or a cloud composed of a large number of hosts or network servers based on cloud computing, etc.

The memory includes at least one type of readable storage medium, the readable storage medium includes flash memory, hard disk, multimedia card, card-type memory (such as SD or DX memory, etc.), random access memory (RAM), static random access memory (SRAM), read only memory (ROM), electrically erasable programmable read only memory (EEPROM), programmable read only memory (PROM), magnetic memory, magnetic disk, optical disk, etc. The operating system and various application software and data installed in the service node device are stored in the memory.

The processor may in some embodiments be a central processing unit (CPU), a controller, a microcontroller, a microprocessor, or other data processing chip.

In the foregoing embodiments, the description of each embodiment has its own emphasis. For parts that are not described or described in detail in a certain embodiment, reference may be made to the relevant descriptions of other embodiments.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Skilled artisans may implement the described functionality using different methods for each particular application, but such embodiments should not be considered beyond the scope of the present application.

The present application implements all or a part of the processes in the methods of the above embodiments, and can also be completed by instructing the relevant hardware through a computer program. The computer program can be stored in a computer-readable storage medium, and when the computer program is executed by the processor, the steps of the foregoing method embodiments may be implemented. Among them, the computer program includes computer program code, and the computer program code may be in the form of source code, object code, executable file or some intermediate form, and the like. The computer-readable medium may include: any entity or device capable of carrying the computer program code, recording medium, U disk, removable hard disk, magnetic disk, optical disk, computer memory, read-only memory (ROM), Random Access Memory (RAM) and software distribution medium, etc.

The above-mentioned embodiments are only used to illustrate the technical solutions of the present application, but not to limit them; although the present application has been described in detail with reference to the foregoing embodiments, those skilled in the art should understand that: it is still possible to implement the foregoing embodiments. The technical solutions described in the examples are modified, or some technical features thereof are equivalently replaced; and these modifications or replacements do not make the essence of the corresponding technical solutions deviate from the spirit and scope of the technical solutions of the embodiments of the present application, and should be included in the within the protection scope of the present application.

What is claimed is:

1. A method for predicting intracellular deterministic events, executed by an electronic apparatus, and comprising the following steps:
   detecting, by the electronic apparatus, global mutant information of mutant genes of a tested sample taken from a target object;
   converting the global mutant information of mutant genes of the tested sample into concerted effect (CE) parameters with a quantitative model that converts discrete qualitative data into continuous space, wherein the quantitative model is a multivariate correlation model between the global mutant information of mutant genes of a tested sample and gene expression activity, and wherein the CE parameters represent the comprehensive influence parameters of mutant genes on the expression activity of any gene in a predetermined genome, and wherein the predetermined genome corresponds to a predetermined pathological or physiological state;

converting the CE parameters into concerted effect burden (CEB) parameters through statistical algorithms, wherein the CEB parameters describe a statistical characteristic of distribution of the CE parameters of the mutant genes of the tested sample, and reflect preference of the mutant genes of the tested sample in determining the evolution of cellular functions; and predicting the intracellular deterministic events based on the CEB parameters.

2. The method of claim 1, wherein the step of converting the global mutant information of mutant genes of the tested sample into concerted effect (CE) parameters with a quantitative model that converts discrete qualitative data into continuous space comprises:

performing random simulations for predetermined number of times, generating a driving force of each mutant gene in the several mutant genes on changing expression of each gene in the predetermined genome; and generating a comprehensive driving force of the mutant genes on changing expression of each gene based on the driving force of each mutant gene in the several mutant genes on changing expression of each gene in the predetermined genome.

3. The method of claim 2, wherein the method further comprises:

acquiring, by the electronic apparatus, at least one evaluation characteristic of the target object relative to the predetermined pathological or physiological state based on the data of the CE parameters of the mutant genes on the expression activity of each gene in the predetermined genome.

4. The method of claim 3, wherein the step of acquiring at least one evaluation characteristic of the target object relative to the predetermined pathological or physiological state comprises:

predicting at least one treatment management factor characteristic of the target object relative to the predetermined pathological or physiological state; and/or acquiring at least one retrospective analysis characteristic of the target object relative to the predetermined pathological or physiological state; and/or acquiring a pathological or physiological state type label of the target object.

5. The method of claim 2, wherein the method further comprises:

acquiring, by the electronic apparatus, at least one evaluation characteristic of the target object relative to the predetermined pathological or physiological state based on data of the CE parameters or data of the CEB parameters of the mutant genes on the expression activity of each gene in the predetermined genome.

6. The method of claim 1, wherein the data of statistical characteristic of distribution of the CE parameters of the mutant genes of the tested sample comprises:

a number of genes whose expression activity is influenced by the mutant genes and meets preset conditions among the genes in the predetermined genome; and/or a sum of absolute values, median, maximum value, and/or variance of each value in the data of the CE parameters.

7. The method of claim 6, wherein the method further comprises:

acquiring, by the electronic apparatus, at least one evaluation characteristic of the target object relative to the predetermined pathological or physiological state based on the data of the CE parameters of the mutant genes on the expression activity of each gene in the predetermined genome.

8. The method of claim 7, wherein the step of acquiring at least one evaluation characteristic of the target object relative to the predetermined pathological or physiological state comprises:

predicting at least one treatment management factor characteristic of the target object relative to the predetermined pathological or physiological state; and/or acquiring at least one retrospective analysis characteristic of the target object relative to the predetermined pathological or physiological state; and/or acquiring a pathological or physiological state type label of the target object.

9. The method of claim 6, wherein the method further comprises:

acquiring, by the electronic apparatus, at least one evaluation characteristic of the target object relative to the predetermined pathological or physiological state based on data of the CE parameters or data of the CEB parameters of the mutant genes on the expression activity of each gene in the predetermined genome.

10. The method of claim 1, wherein the step of converting the CE parameters into concerted effect burden (CEB) parameters comprises:

generating at least two data of statistical characteristic parameters for describing the data of the CE parameters; and generating composite data of statistical characteristic parameters based on the at least two data of statistical characteristic parameters.

11. The method of claim 10, wherein the method further comprises:

acquiring, by the electronic apparatus, at least one evaluation characteristic of the target object relative to the predetermined pathological or physiological state based on the data of the CE parameters of the mutant genes on the expression activity of each gene in the predetermined genome.

12. The method of claim 11, wherein the step of acquiring at least one evaluation characteristic of the target object relative to the predetermined pathological or physiological state comprises:

predicting at least one treatment management factor characteristic of the target object relative to the predetermined pathological or physiological state; and/or acquiring at least one retrospective analysis characteristic of the target object relative to the predetermined pathological or physiological state; and/or acquiring a pathological or physiological state type label of the target object.

13. The method of claim 10, wherein the method further comprises:

acquiring, by the electronic apparatus, at least one evaluation characteristic of the target object relative to the predetermined pathological or physiological state based on data of the CE parameters or data of the CEB parameters of the mutant genes on the expression activity of each gene in the predetermined genome.

14. The method of claim 1, wherein the step of converting the CE parameters into concerted effect burden (CEB) parameters comprises:
    performing random simulations for predetermined number of times to generate simulated CE parameters $CE_{null}$, using the simulated CE parameters $CE_{null}$ to perform noise reduction processing on the data of the CE parameters of the mutant genes on the expression activity of each gene in the predetermined genome; and
    acquiring data of statistical characteristic parameters for describing the distribution of the CE parameters based on a result of the noise reduction processing.

15. The method of claim 1, wherein the method further comprises:
    acquiring, by the electronic apparatus, at least one evaluation characteristic of the target object relative to the predetermined pathological or physiological state based on the data of the CE parameters of the mutant genes on the expression activity of each gene in the predetermined genome.

16. The method of claim 15, wherein the step of acquiring at least one evaluation characteristic of the target object relative to the predetermined pathological or physiological state comprises:
    predicting at least one treatment management factor characteristic of the target object relative to the predetermined pathological or physiological state; and/or
    acquiring at least one retrospective analysis characteristic of the target object relative to the predetermined pathological or physiological state; and/or
    acquiring a pathological or physiological state type label of the target object.

17. The method of claim 1, wherein the method further comprises:
    acquiring, by the electronic apparatus, at least one evaluation characteristic of the target object relative to the predetermined pathological or physiological state based on data of the CE parameters or data of the CEB parameters of the mutant genes on the expression activity of each gene in the predetermined genome.

18. An electronic apparatus, comprising: a memory, a processor, and a program stored in the memory, the program being configured to be executed by the processor, and the processor implementing the program when executing: a method for predicting intracellular deterministic event and the processor is configured for:
    detecting, by the electronic apparatus, global mutant information of mutant genes of a tested sample taken from a target object;
    converting the global mutant information of mutant genes of the tested sample into concerted effect (CE) parameters with a quantitative model that converts discrete qualitative data into continuous space, wherein the quantitative model is a multivariate correlation model between the global mutant information of mutant genes of a tested sample and gene expression activity, and wherein the CE parameters represent the comprehensive influence parameters of mutant genes on the expression activity of any gene in a predetermined genome, and wherein the predetermined genome corresponds to a predetermined pathological or physiological state;
    converting the CE parameters into concerted effect burden (CEB) parameters through statistical algorithms, and wherein the CEB parameters describe a statistical characteristic of distribution of the CE parameters of the mutant genes of the tested sample, and reflect preference of the mutant genes of the tested sample in determining the evolution of cellular functions; and
    predicting the intracellular deterministic events based on the CEB parameters.

* * * * *